United States Patent [19]

Gruetzmacher

[11] Patent Number: 5,207,004
[45] Date of Patent: May 4, 1993

[54] POST LEVEL

[75] Inventor: Richard J. Gruetzmacher, Menomonee Falls, Wis.

[73] Assignee: Johnson Level & Tool Mfg. Co., Inc., Mequon, Wis.

[21] Appl. No.: 794,570

[22] Filed: Nov. 19, 1991

[51] Int. Cl.$^5$ .............................................. G01C 9/24
[52] U.S. Cl. ........................................ 33/379; 33/382; 33/373
[58] Field of Search ................. 33/451, 352, 379, 381, 33/348.2, 353, 370, 372, 371, 373, 380

[56] References Cited

U.S. PATENT DOCUMENTS

| 312,266 | 2/1885 | Gurley | 33/373 |
|---|---|---|---|
| 892,353 | 6/1908 | Blair | 33/379 |
| 1,082,163 | 12/1913 | Lung | 33/381 |
| 1,845,801 | 2/1932 | Kupferman | 33/451 |
| 2,752,693 | 7/1956 | Wallschleger | 33/379 |
| 3,009,254 | 11/1961 | Youngs | 33/379 |
| 3,186,100 | 6/1965 | Nakano | 33/379 |
| 3,524,259 | 7/1970 | Handley | 33/382 |
| 3,752,566 | 8/1973 | Mathews | 33/451 |
| 4,343,093 | 8/1982 | Eadens | 24/299 |
| 4,765,061 | 8/1988 | Rawlings et al. | 33/379 |
| 4,976,040 | 12/1990 | Mish et al. | 33/372 |

FOREIGN PATENT DOCUMENTS

| 1149539 | 5/1963 | Fed. Rep. of Germany | 33/379 |
|---|---|---|---|
| 417982 | 2/1967 | Switzerland | 33/373 |

Primary Examiner—William A. Cuchlinski, Jr.
Assistant Examiner—Alvin Wirthlin
Attorney, Agent, or Firm—Andrus, Sceales, Starke & Sawall

[57] ABSTRACT

A post level is defined by a pair of right-angle walls. A horizontal bubble vial is mounted in each wall, and a vertical bubble vial is mounted at the intersection of the walls. The vials are mounted in the interior of a pair of spaced protrusions formed in each wall, which define internal structure engaging and cradling an end of the vial without positively retaining the vial within the protrusion. The protrusions open onto the inner surface of the walls, and a retainer plate is positioned over the opening of the protrusions to retain the vials within the interior of the protrusions. The retainer plate is light-reflective to enhance visibility of the vial bubble.

4 Claims, 2 Drawing Sheets

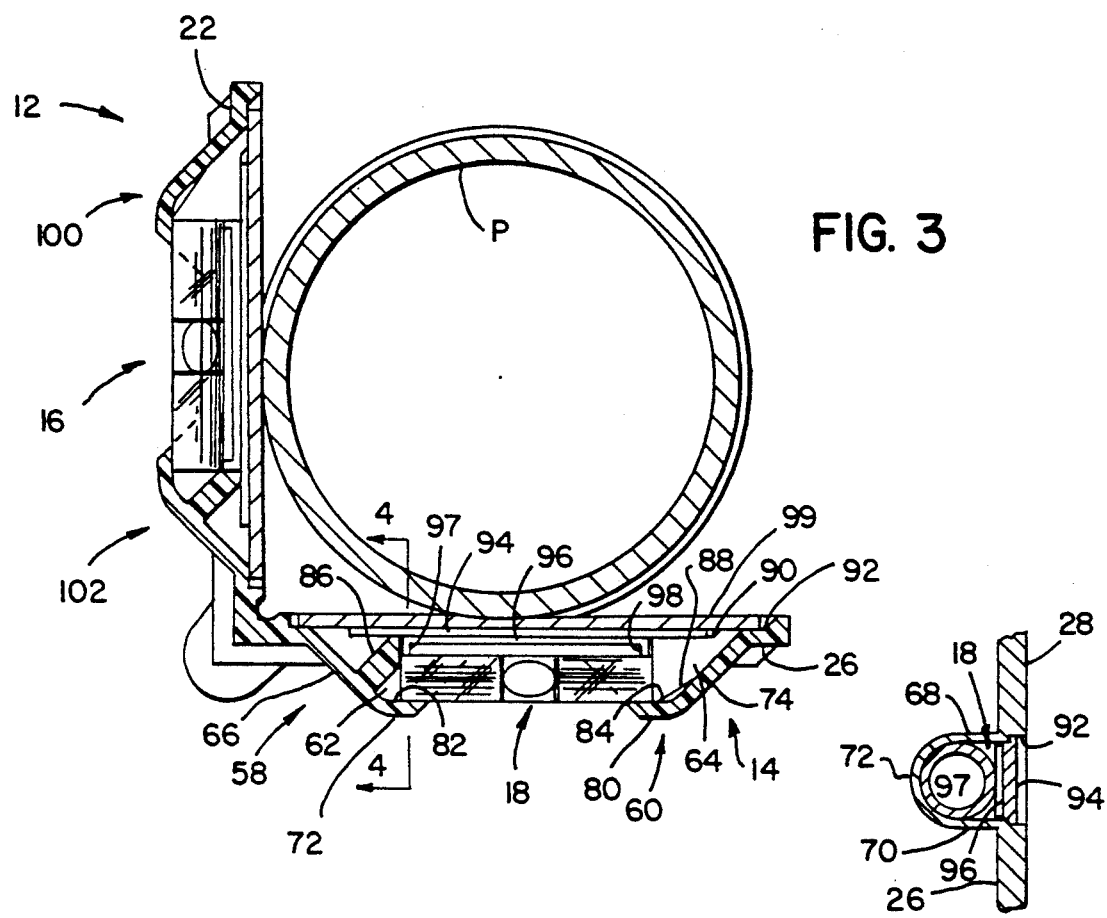
FIG. 3
FIG. 4
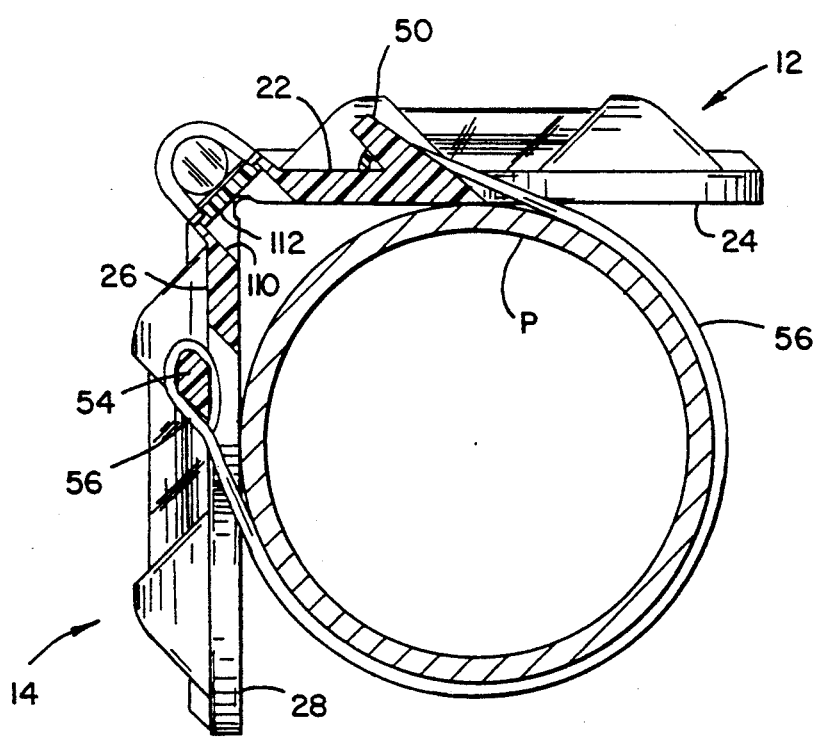
FIG. 5

POST LEVEL

BACKGROUND OF THE INVENTION

The present invention relates to levels which utilize a bubble vial, and more particularly to an arrangement for mounting a bubble vial to a level.

Various devices are known for attachment to an object, such as a post, to determine whether the object is plumb. Eadens U.S. Pat. No. 4,343,093 discloses a tool having a pair of "arms", oriented at right angles to each other, with a bullseye-type bubble level mounted to one of the arms. A chain is employed for mounting the tool to the post. Mish et al U.S. Pat. No. 4,976,040 shows a post level having a pair of columnar level bodies. A pair of elastic bands secure the level bodies to a post. Each body has a horizontal and a vertical bubble vial mounted within recesses formed in the body.

It is an object of the present invention to provide a post level of simple construction which provides a high degree of accuracy in use.

It is a further object of the invention to provide an improved arrangement for mounting a bubble vial to a level, such as a post level.

It is a further object of the invention to provide a vial mounting arrangement in which the vials can easily, efficiently and securely be mounted to the level.

Yet another object of the invention is to provide a level in which the visibility of the vials is enhanced.

In accordance with one aspect of the invention, a post level includes a body defining a pair of vertical walls, each having an inner surface and an outer surface. The walls are arranged such that their inner surfaces engage a post at a pair of spaced locations on the post, with the walls preferably being arranged at right angles to each other. A pair of horizontal bubble vials are mounted one to each wall of the body. Each vial extends along a horizontal longitudinal axis, and the vial longitudinal axes are oriented non-parallel to each other. Each vial is mounted to one of the walls by means of one or more outward protrusions associated with the wall, with the vial being located within the interior of the one or more outward protrusions, which open onto the inner surface of the wall. The one or more outward protrusions define internal structure which engages and cradles at least the opposite ends of the vial, without sufficiently engaging the vial ends to retain the vial within the interior of the one or more protrusions. A retainer member is mounted over the opening of the one or more protrusions onto the inner surface of the wall, to secure the vial within the interior of the one or more protrusions. In a preferred form, the one or more outward protrusions comprise a pair of spaced protrusions, each of which includes internal structure which engages and cradles an end of the vial. The vial is visible when viewed from a direction looking toward the outer surface of the wall through a space located between the pair of protrusions. The vial is also visible through the space when looking at the vial from above and below the protrusions. The pair of spaced protrusions each include internal structure engaging the ends of the vial to laterally position the vial in a direction parallel to its longitudinal axis. In one form, the internal structure includes an abutment surface provided in the interior of one of the protrusions, and a ramped surface provided in the other of the pair of protrusions. The ramped surface engages one end of the vial and guides the other end of the vial toward the abutment surface, as the vial is moved in an outward direction into the interior of the pair of protrusions. The retainer member is preferably in the form of a plate mounted within a groove formed on the inner surface of the wall, with the interior of the one or more protrusions opening into the groove. The retainer member includes structure, such as a pair of ears, which engages the vial to fix the vial in position within the pair of protrusions.

In accordance with another aspect of the invention, the plate provides a light-reflective surface facing the vial. The light-reflective surface reflects light through the vial to enhance visibility of the vial bubble.

The invention further contemplates a method of mounting a vial to a level, substantially in accordance with the foregoing summary.

In a particularly preferred form of the invention, the improved vial-mounting and visibility-enhancing features, as summarized above, are incorporated into a level, such as a post level, to provide simple and efficient construction and highly satisfactory operation.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a section view taken along line 3—3 of FIG. 2;

FIG. 4 is a partial section view taken along line 4—4 of FIG. 3; and

FIG. 5 is a section view taken along line 5—5 of FIG. 2.

DETAILED DESCRIPTION OF THE INVENTION

Figure 1:
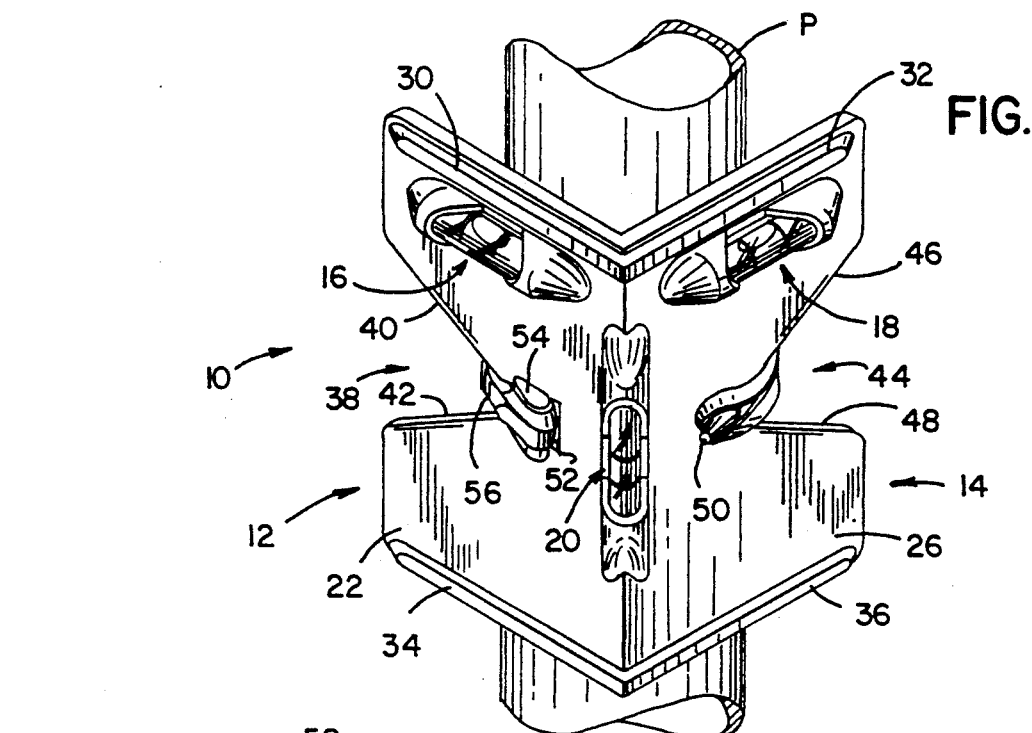
FIG. 1 is a perspective view showing the post level of the invention attached to at post.

FIG. 1 illustrates a post level, shown generally at 10, constructed according to the invention, secured to a post P. Post level 10 includes a pair of planar walls, shown generally at 12, 14. A pair of plumb indicating vials 16, 18 are mounted to walls 12, 14, respectively, and a level-indicating vial 20 is mounted adjacent the intersection of walls 12, 14.

For purposes of convenience, walls 12, 14 and vial 20 will be referred to as "vertical", while vials 16, 18 will be referred to as "horizontal". Such terminology is intended only to describe the various components relative to each other, and not to their absolute orientation.

Walls 12, 14 define an internal included angle of 90°. Accordingly, the longitudinal axes of vials 16, 18 are oriented at 90° to each other.

Wall 12 defines an outer surface 22 and an inner surface 24 (FIG. 5), and wall 14 defines an outer surface 26 and an inner surface 28 (FIG. 5). Upper horizontal ribs 30, 32 are formed on wall outer surfaces 22, 26, respectively, meeting at the intersection of walls 22, 26. Similarly, lower horizontal ribs 34, 36 are formed on wall outer surfaces 22, 26, meeting at the intersection of walls 22, 26. Ribs 30–36 act to stiffen and reinforce walls 12, 14.

Wall 12 is provided with a notch, shown generally at 38, formed by a pair of converging edges 40, 42. Similarly, wall 14 is provided with a notch 44 defined by a pair of converging edges 46, 48.

A peg 50 is formed on outer surface 26 of wall 14 slightly inwardly from the inner end of notch 38, extending outwardly and toward the intersection of walls 22, 26. Edges 40, 42 of notch 38, on the other hand, terminate in a recess 52 which is spanned by an anchor 54, formed integrally with wall 12 and extending outwardly from its outer surface 22.

A rubber band 56 is knotted about anchor 54, and is adapted to be wrapped around post P and hooked onto peg 50, to attach post level 10 to post P. The elasticity provided by rubber band 56 accommodates attachment of post level 10 to varying sizes of posts, and its knotting about anchor 54 acts to retain rubber band 56 on post level 10 so as to prevent it from being misplaced. In the event rubber band 56 is broken or lost, it can easily be replaced by simply knotting a replacement rubber band about anchor 54.

Figure 2:
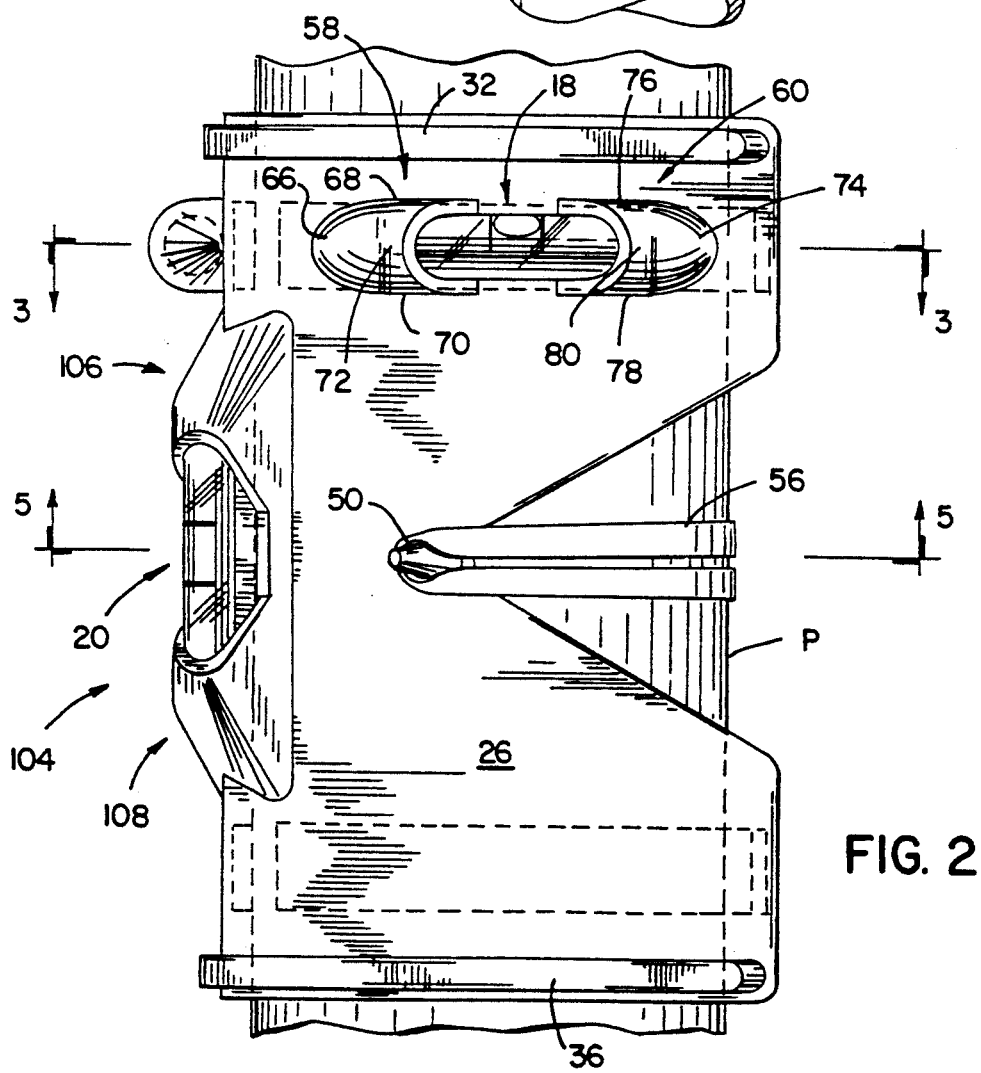
FIG. 2 is a right side elevation view of the post level of FIG. 1.

Referring to FIGS. 2 and 3, the mounting of vial 18 to wall 14 will be explained in detail. It is understood that the following description applies with equal force to the mounting of vial 16 to wall 12.

A pair of protrusions 58, 60 are formed in the upper portion of wall 14, extending outwardly from its outer surface 26. Protrusion 58 defines an internal cavity 62, while protrusion 60 defines an internal cavity 64. Protrusion 58 is defined by an end wall 66, a pair of side walls 68, 70, and an outer wall 72. Similarly, protrusion 60 is defined by an end wall 74, a pair of side walls 76, 78, and an outer wall 80.

Referring to protrusion 58, its side walls 68, 70 and outer wall 72 terminate in a U-shaped edge oriented at an angle of approximately 135° relative to outer surface 26 of wall 14. Similarly, side walls 76, 78 and outer wall 80 of protrusion 60 terminate in a U-shaped edge lying in a plane of approximately 135° relative to outer surface 26 of wall 14. In this manner, the facing U-shaped edges of protrusions 58, 60 are oriented at approximately 90° to each other.

An opening or space is located between the above-described U-shaped edges of protrusions 58 and 60, and vial 18 is visible therethrough when it is viewed in a direction looking toward outer surface 26 of wall 14. Vial 18 as mounted within protrusions 58, 60 is spaced outwardly from outer surface 26 of wall 14, so as to be visible from vertically above and below vial 18 through the space between protrusions 58, 60.

Referring to FIG. 3, the inside surface of outer wall 72 of protrusion 58 defines a lip 82, and the inside surface of outer wall 80 of protrusion 60 defines a lip 84. Lips 82, 84 engage the ends of vial 18. The ends of vial 18 engage lips 82, 84 as will be explained so as to mount vial 18 within protrusions 58, 60.

As shown in FIG. 4, the facing inner surfaces of side walls 68, 70 of protrusion 58, in combination with outer wall 72 and lip 82 defined thereby, make up a U-shaped cross-section which engages and cradles the end of vial 18. Such structure does not of itself sufficiently positively engage the end of vial 18 to alone fix it within internal cavity 62.

Side walls 76, 78 and outer wall 80 of protrusion 60 define an internal cross-section identical to that of protrusion 58 as shown in FIG. 4, and an end of vial 18 is maintained within its internal cavity 64 in the same manner as set forth with respect to protrusion 58.

As shown in FIG. 3, an abutment 86 is located in internal cavity 62 of protrusion 58, defining an end surface which engages the end of vial 18 located within internal cavity 62. Within internal cavity 64 of protrusion 60, an angled ramped surface 88 extends inwardly from end wall 74 and outer wall 80. Ramped surface 88 and abutment 86 are formed so as to provide a dimension between the rightwardly facing end surface of abutment 86 and the termination of ramped surface 88 at lip 84, which is substantially equal to, or only slightly greater than, the length of vial 18.

Internal cavities 62, 64 of protrusions 58, 60, respectively, open onto a groove 90 formed in inner surface 24 of wall 14. Groove 90 in turn opens onto a groove 92, which opens onto inner surface 24 of wall 12. Groove 90 terminates inwardly of the outer ends of cavities 62, 64. Groove 92, on the other hand, encompasses the entire periphery of internal cavities 62, 64 as well as the space located between protrusions 58, 60.

A plate 94 is mounted in groove 90. Plate 94 defines a base, a raised portion 96, and a pair of ears 97, 98 (FIGS. 3, 4) extending outwardly from the opposite ends of raised portion 96. The outer surface of raised portion 96 faces vial 18, and ears 97, 98 engage the ends of vial 18. If desired, a strip magnet 99 is mounted in groove 92. Vial 18 is mounted within protrusions 58 and 60 when magnet 99 and plate 94 are not yet in place, and internal cavities 62, 64 of protrusions 58, 60, respectively, are exposed. Vial 18 is inserted into internal cavities 62, 64 in an outward direction. The rightward end of vial 18 engages ramped surface 88, so as to force the leftward end of vial 18 toward abutment 86 as vial 18 is pushed outwardly. If desired, a small quantity of adhesive may be placed between the ends of vial 18 and lips 82, 84 to maintain vial 18 in position. Normally, however, no adhesive is used between vial 18 and lips 82, 84. Abutment member 86 and ramped surface 88 cooperate to fix the lateral position of vial 18. Plate 94 is then sonic welded about its periphery to wall 14 adjacent groove 90. Raised surface 96 of plate 94 faces vial 18 and ears 97, 98 engage the inner edge of vial 18, and vial 18 is trapped within cavities 62, 64 between ears 97, 98 and lips 82, 84, respectively. Raised surface 96 provides a background for vial 18.

Magnet 99 is then secured within groove 92 if desired, and similar magnets are located behind vial 16 and in a pair of lower grooves formed in inner surfaces 24, 28 below groove 92 and the groove behind vial 16. In this manner, post level 10 can be mounted to a metallic post P without use of rubber band 54.

The outer surface of plate raised portion 96 is light-reflective. In a prototype embodiment, plate 94 and its raised portion 96 are molded of a white ABS plastic. This arrangement reflects light through the translucent liquid contained within vial 18. Such reflection of light through vial 18 significantly enhances the visibility of the bubble of vial 18 when viewed in a direction looking toward wall 14, as well as when viewed from above or below.

Wall 14 and its protrusions 58, 60, as well as the other components of wall 14 as described, are injection molded along with wall 12 and its components in accordance with standard injection molding technology. In a preferred form, walls 12 and 14 are molded of a dark plastic, such light gray or black and the light-reflective outer surface of plate raised portion 96 contrasts with the surrounding material of protrusions 58, 60 to even further increase the visibility of the bubble of vial 18.

As noted previously, vial 16 is mounted to wall 12, which includes a pair of spaced protrusions 100, 102 constructed identically to protrusions 58, 60, respectively. Thus, no further explanation of the mounting of vial 16 is necessary.

Referring to FIGS. 2 and 5, vertical vial 20 is mounted within a protrusion 104 extending outwardly at the intersection of walls 12 and 14, extending along a vertical axis. Protrusion 104 defines a pair of spaced end portions 106, 108, which provide internal structure identical to that of protrusions 58, 60 as described. Vial 20 is mounted in the interior of protrusion end portions 106, 108 in the same manner as described above with respect to horizontal vial 18. A channel 110 (FIG. 5) extends inwardly from inner surfaces 24, 28 of walls 12, 14, respectively, to provide placement of vial 18 within the interior or protrusion end portions 106, 108. A plate 112, constructed identically to plate 94 and its raised portion 96, is mounted at the bottom of channel 110 so as to retain vial 20 within the interiors of protrusion end portions 106, 108. As before, plate 112 provides a light-reflective outer surface behind vial 20 to enhance the visibility of the bubble of vial 20 during use.

Various alternatives and embodiments are contemplated as being within the scope of the following claims particularly pointing out and distinctly claiming the subject matter regarded as the invention.

I claim:

1. A post level, comprising:
   a body defining a pair of vertical walls each having an inner surface and an outer surface, the walls being arranged relative to each other such that their inner surfaces are engageable with a post at a pair of spaced locations on the post; and
   a pair of level-indicating vials mounted one to each wall of the body, wherein each vial extends along a horizontal longitudinal axis with the vial longitudinal axes being oriented non-parallel to each other, wherein each vial is mounted to one of the walls by means of:
      a pair of spaced outward protrusions associated with the wall, with each end of the vial being located within the interior of one of the spaced outward protrusions, each outward protrusion opening onto the inner surface of the wall and defining internal structure which engages and cradles an end of the vial without sufficiently engaging the vial to alone retain the vial therewithin, wherein the vial is spaced outwardly from the wall outer surface and is visible when viewed vertically and when viewed from a direction looking toward the outer surface of the wall, through a space located between the pair of protrusions, and
      wherein the pair of spaced protrusions include internal structure for engaging the ends of the vial to laterally position the vial in a direction parallel to the longitudinal axis of the vial, comprising an abutment surface provided in a first one of the pair of spaced protrusions, and a ramped surface provided in a second one of the pair of spaced protrusions angled toward the abutment surface, wherein the ramped surface engages one end of the vial and guides the other end of the vial toward the abutment surface as the vial is moved in an outward direction into the interior of the pair of protrusions; and
      a retainer member mounted over the opening of the pair of spaced protrusions onto the inner surface of the wall to maintain the vial within the interior of the pair of spaced protrusions.

2. The post level of claim 1, wherein the retainer member comprises a plate mounted in a groove formed in the inner surface of the wall onto which the pair of spaced protrusions open, and wherein the plate includes structure extending toward the vial for engaging the vial.

3. In a level including a member defining an inner surface and an outer surface, a method of mounting a vial to the member, the vial having a pair of end portions, comprising the steps of:
   providing structure defining an internal cavity on the member, the structure defining at least a pair of spaced retainer portions with an opening therebetween, the retainer portions being located so as to be engageable with the end portions of the vial, wherein the internal cavity opens onto the inner surface of the member;
   providing at least the portions of the member adjacent the opening with a relatively dark color;
   placing the vial into the internal cavity such that the end portions of the vial engage the pair of spaced retainer portions to cradle at least the end portions of the vial without sufficiently engaging the vial end portions to retain the vial within the internal cavity, wherein the central portion of the vial is visible when viewed from a direction looking toward the outer surface of the member; and
   providing a light colored surface on a retainer member, and placing the retainer member over the opening of the internal cavity onto the inner surface of the member to maintain the vial within the internal cavity, wherein the retainer member is placed such that its light colored surface faces the vial to contrast with the dark color of the portions of the member adjacent the vial, whereby light is reflected off of the light colored surface and through the vial to enhance visibility of a bubble associated with the vial.

4. A level, comprising:
   a member defining an inner surface and an outer surface;
   a vial having a pair of end portions and containing a quantity of translucent liquid and a bubble;
   structure defining an internal cavity formed integrally with the member, the internal cavity opening onto the inner surface and further defining an opening providing visual access to the internal cavity from the outer surface of the member, wherein the vial is placed within the internal cavity and wherein the central portion of the vial is visible through the opening when viewed from a direction looking toward the outer surface of the member, wherein at least the portions of the member adjacent the internal cavity defining structure are formed of a relatively dark material; and
   a plate mounted over the opening of the internal cavity onto the inner surface to retain the vial within the internal cavity, the plate having a first surface located adjacent the vial to provide a background for the vial when the vial is viewed from a direction looking toward the outer surface of the member, wherein the first surface of the plate is relatively light in color to contrast with the relatively dark material of the member adjacent the internal cavity defining structure and to reflect light through the vial liquid to enhance visibility of the vial bubble.

* * * * *